July 12, 1949.  R. W. GROVE  2,475,784
TOOLHOLDER
Filed Jan. 19, 1945
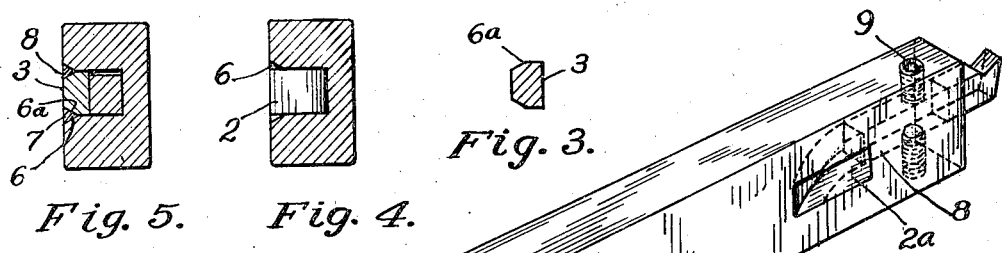
Roy W. Grove
INVENTOR Patented July 12, 1949

2,475,784

UNITED STATES PATENT OFFICE 2,475,784

TOOLHOLDER

Roy W. Grove, Homestead, Pa.

Application January 19, 1945, Serial No. 573,603

3 Claims. (Cl. 29—98)

This invention relates to the art of machine tools, and more specifically, to tool holders for lathes, planers, boring-mills, shapers, and the like, employing tool-bit holders, and is of special utility in the working of hard or rough, unfinished castings, forgings, and the like.

One object of this invention is to provide a novel tool holder which is especially adapted for holding the cutting bit in a novel position with respect to the material being machined, so as to prevent vibration, chattering and the detrimental effects thereof, such as broken bits, frequent sharpening and excessive tool wear, as well as distortion of the work.

Another object of this invention is to provide a novel tool holder having an opening for receiving a bit which is formed in a novel manner, to enable better gripping of the bit when inserted and secured therein.

Another object of this invention is to provide a novel tool holder having a bit-receiving opening which is machined therein to present flat opposite side walls against which the bit may be securely clamped.

Another object of this invention is to provide a novel method of supporting a tool bit relative to the work being machined.

Still another object of this invention is to provide a novel method of forming bit-receiving openings in a tool holder, which openings have opposed flat side walls.

These and other objects of this invention will become more apparent upon consideration of the following detailed description of preferred embodiments thereof, when taken in connection with the attached drawing, in which:

Figure 1 is a perspective view of one form of a tool holder embodying this invention, with bits inserted in openings provided in each end of the holder;

Fig. 2 is a partial longitudinal section view of the straight end of the holder, with the bit shown in elevation;

Fig. 3 is a cross-section view of a part of the holder prior to assembly therewith;

Fig. 4 is a cross-section view of the holder, taken through a bit-receiving opening, before assembly of the part shown in Fig. 3 therewith;

Fig. 5 is a cross-section view of the holder, taken through a bit-receiving opening, and illustrating the assembly of the part shown in Fig. 3 therewith;

Fig. 6 is an elevation view, partly in section, of the holder shown in Figs. 1 to 5 and illustrating material being machined in cross-section, and with a support for the holder shown in dot and dash lines;

Fig. 7 is a view similar to Fig. 6, but illustrating the former practice of supporting a bit relative to the material being machined;

Fig. 8 is a longitudinal section view of one end of a modified form of holder, with the work being machined also shown in section; and Fig. 9 is a longitudinal section of the holder shown in Fig. 8, taken substantially on the line IX—IX thereof.

Bit holders for machine tools, such as lathes, planers, shapers, and the like, have heretofore been constructed in a manner so that the bit is generally supported at an angle to the horizontal, so that when advanced into engagement with the work being machined, any bending of the bit causes the bit to bite more deeply into the work and, consequently, very often results in vibration and chattering. The results of vibration and chatter lead to broken bits, and also necessitate frequent sharpening of the bits because of the excessive wear caused by the repeated shock, and, of course, it also impairs the quality of the work being done.

The bit holder illustrated in Figs. 1 to 6, 8 and 9 is especially constructed to support the bit in a manner to eliminate the undesirable results stated above, and to this end, comprises a generally straight bar 1, which may have one end thereof bent at an angle of about 30°, as illustrated. When the holder is made with a bent end, as illustrated in Fig. 1, each end may be provided with an opening for receiving a bit. It should be understood that, although the holder is illustrated with a bent end, this may obviously be omitted, if desired. The tool-receiving openings 2 and 2a at each end are formed with opposite side walls which are flat, by milling a slot from the end of the holder inwardly the desired distance, as shown in Fig. 4. In the past, it has been customary to broach the bit openings in tool holders, but this results in uneven surfaces, which, as will be hereinafter more fully pointed out, contributes materially to breakage of tool bits. After the slots 2 and 2a have been milled in opposite ends of the holder body 1, resulting in providing flat side walls for the slots, a closure strip 3, which may also be milled to have flat sides, and preferably a pair of beveled side edges 6a adapted to be positioned at the outer side of the slots, is positioned in the open side of each slot, and secured in position by welding, or the like, as at 8. In order to facilitate obtaining a good welded joint, the outer edges of the slots 2 and 2a are also preferably flared outwardly as at 6 (Fig. 4). After welding, the outer surface may be finished off flush.

As illustrated in Fig. 1, the slot 2 is milled along the bent end of the holder body 1, so that the resulting tool opening opens at one side of the tool holder, as well as at the adjacent end thereof, to facilitate knocking out of the bit. The bit slot 2a at the straight end of the holder is milled in a manner so that it curves outwardly to one side at its inner end, and the filler piece 3 for slot 2a is of a length such that it terminates short of the inner end of this slot, so as to provide an opening at one side of the holder, to facilitate knocking the bit out of opening 2a. This is an important feature, especially when bits become wedged in their respective openings due to bits of scale, or the like, being forced into the small clearances between the bit and bit opening.

Preferably, the bit openings 2 and 2a have their upper and lower surfaces 10 and 10a, as viewed in Fig. 6, flared outwardly toward the end of the holder, for a purpose to be described. In order to secure a bit in openings 2 and 2a, holes are tapped substantially at right-angles to the openings 2 and 2a, for receiving setscrews 9.

In the use of the bit holder thus far described, it may be mounted in a machine tool having a clamping post 20 by tightening a setscrew 21 against an adjusting wedge 22 which, in turn, may be supported on a base 23 mounted on a carriage 24. It will be observed that, inasmuch as the bit-receiving openings 2 and 2a have their longitudinal axes in the same plane as the longitudinal axis of the holder 1, when a bit 12 is inserted in opening 2a, for example, it will have its longitudinal axis inclined downwardly with respect to the longitudinal axis of the holder. In mounting a bit 12 in a bit opening, the lower adjusting screw 9 is turned outwardly, so that it does not project into the bit opening so that the bit may lie in contact all along the lower flat wall of the bit opening. The upper setscrew 9 is then tightened into engagement with the bit to maintain the lower flat surface of the bit in engagement with the lower flat surface of the bit opening under pressure. This manner of supporting the bit is in sharp contrast to the manner in which the bit is supported in openings which are broached and, consequently, have side walls which are of irregular configuration, so that the bit is supported only at one or two surface points, because the entire length of the lower surface of the bit being held in contact with the lower wall of the bit opening obviously provides the maximum possible frictional engagement between the bit and holder resisting relative longitudinal movement of the bit and holder, while, at the same time, eliminates the provision of a fulcrum inherent in broached openings, and about which the bit may bend and readily be broken off. It will be noted that the bit is also held so that it extends at the same inclination to the axis of the holder as the lower surface of the bit opening.

With the bit mounted in the holder and the holder supported in the manner shown in Fig. 6, it will be observed that the longitudinal axis of the bit is substantially parallel with a horizontal plane through the axis of the work, and that the cutting edge of the bit engages the work substantially at a point lying in such horizontal plane. Although the cutting edge of the bit may be somewhat raised or lowered, it is preferred that it be positioned substantially as shown, to obtain optimum conditions for preventing chattering and accompanying deleterious results. With the bit positioned as shown in Fig. 6, and its cutting edge engaging the work in the manner shown, it will be observed that downward travel of the work by rotation in a counterclockwise direction may cause some downward bending of the bit along substantially the arc described by radial 33. However, such arcuate travel of bit 12 is relatively small and results in movement of the bit away from the work, whereby the depth of the cut is lessened and this acts to release the bit, there being no tendency to cause further bending of the bit and, therefore, rebound and resultant chatter are eliminated. Moreover, as pointed out above, the manner of supporting the bit in engagement throughout its length with the flat lower surface of the opening in the bit holder all contributes toward eliminating bit breakage, and especially firm and rigid mounting of the bit in the holder and a consequent reduction in chatter, and the like. While the holder is illustrated as being made of metal, this preferably is of a metal having some resiliency to contribute to bending along the radial 33, and thus contribute in the elimination of chatter and the undesirable results which follow.

This may be contrasted with the prior method of supporting bits illustrated in Fig. 7, where a tool holder 1a is provided with a bit opening extending at an angle to the longitudinal axis of the holder which renders it, as a practical matter, impossible to support the bit when its longitudinal axis is parallel with a horizontal plane through the axis of the work being machined. Such a tool holder supports the bit at an angle to a horizontal plane through the axis of the work being machined, so that even if the cutting edge of the bit be positioned substantially in such horizontal plane, it will be observed that, upon rotation of the work in the direction of the arrows 28a, bending of the bit results in movement of the cutting edge along the arc shown in dot and dash lines in Fig. 7, so that the cutting edge moves further into the work, thus increasing the bending moment on the bit and holder which results in chatter and excessive strain on the bit and holder. This not only causes excessive wear on the bit, but also, as previously pointed out, produces distortion of the work being machined and renders it impossible to attain the desired dimensions.

Figs. 8 and 9 illustrate a modified form of the invention, wherein means are provided for obtaining a still better clamping of the bit in the tool opening 2c. For this purpose, there is provided a wedge 40 having bent ends 41 adapted to extend laterally outwardly at opposite ends of the tool opening, to retain the wedge 40 within the opening. In assembling a bit 12c, the wedge 40 is positioned at the top of the opening and then the upper setscrews are tightened to not only force the lower flat surface of the bit into engagement throughout the length thereof with the lower flat surface of the tool opening, but also to force the lower flat surface of the wedge, which is preferably also formed by a milling operation, into engagement throughout the length thereof with the top flat surface of the bit. This results in obtaining frictional engagement throughout two longitudinally extending surfaces of the bit, and thereby results in substantially doubling the frictional engagement resisting relative movement of the bit and tool holder.

In both of the modifications of the invention described, setscrews 9 are provided at opposite sides of the tool opening, so that the tool holder may be rotated about its longitudinal axis 180°, so that a setscrew will always be available at the top of the holder for clamping the bit in its tool opening. However, at any given position of the tool holder, only the upper setscrews are employed for clamping purposes.

Having described preferred embodiments of the invention in accordance with the patent statutes, it should be understood that this invention should not be limited to these particular embodiments, inasmuch as it will be obvious to persons skilled in the art that many changes and modifications may be made therein, without departing from the broad spirit and scope of this invention. Therefore, it is desired that the invention be interpreted as broadly as possible, and that it be limited only as required by the prior art.

I claim as my invention:

1. A tool holder comprising an elongated body portion having a bit-receiving opening at one end, the bottom bit-engaging wall of said opening diverging downwardly and outwardly from the longitudinal axis of said holder, and means cooperating with the top wall of said opening for forcing a bit in said opening into pressure engagement with said bottom wall.

2. A tool holder comprising an elongated body portion having a bit-receiving opening at one end, the top and bottom walls of said opening when said holder is in operative position inclining outwardly from the longitudinal axis of said holder, and means cooperating with the top wall of said opening for securing a bit in direct engagement with the bottom wall of said opening.

3. A tool holder comprising an elongated body portion having a bit-receiving bore opening at one end, said bore extending substantially parallel with the longitudinal axis of said holder, the top and bottom walls of said opening when said holder is mounted in operative position inclining outwardly from the longitudinal axis of said holder, and screw means threaded in each of said top and bottom walls for clamping the bit in engagement with the other of said walls, respectively.

ROY W. GROVE.

REFERENCES CITED

The following references are of record in the file of this patent:

UNITED STATES PATENTS

| Number | Name | Date |
|---|---|---|
| 445,391 | Eberhardt | July 7, 1891 |
| 687,237 | Jackson | Nov. 26, 1901 |
| 829,081 | Moras | Aug. 21, 1906 |
| 943,499 | Wells | Dec. 14, 1909 |
| 1,169,594 | Amborn | Jan. 25, 1916 |
| 1,214,498 | Armstrong | Feb. 6, 1917 |
| 1,324,809 | Giles | Dec. 16, 1919 |
| 1,343,257 | Fletcher | June 15, 1920 |
| 1,355,698 | Rouillard | Oct. 12, 1920 |
| 1,489,549 | Roger | Apr. 8, 1924 |
| 1,849,392 | West | Mar. 15, 1932 |